H. MEWES.
CUTTING APPARATUS FOR HARVESTERS.
No. 105,111.                          Patented July 5, 1870.
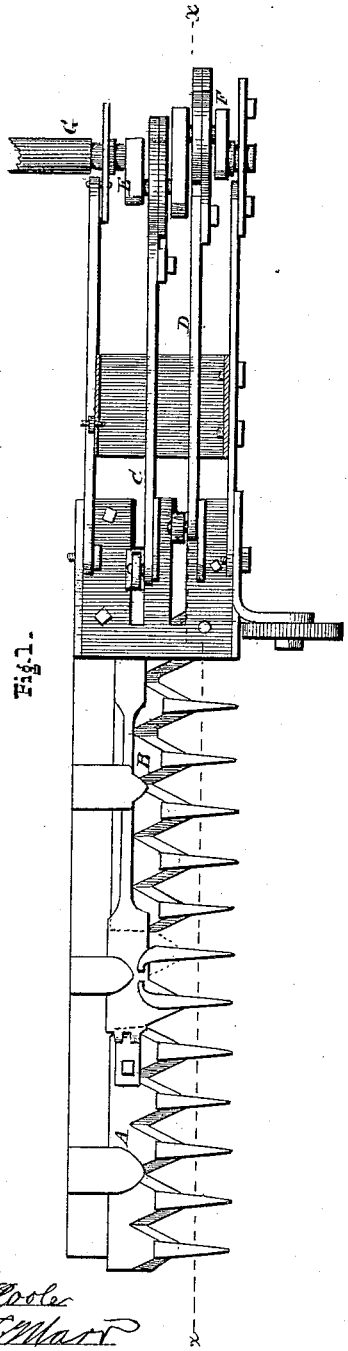
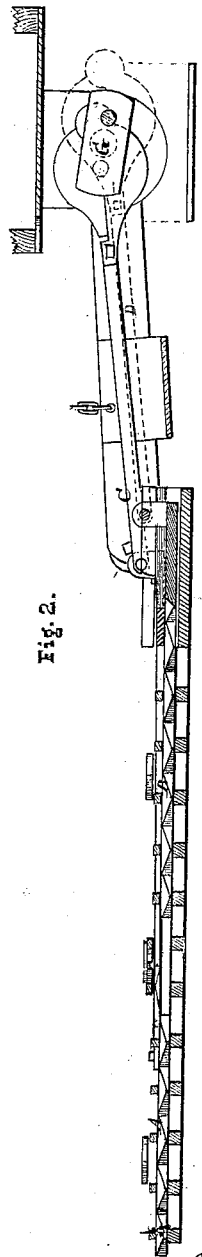

United States Patent Office.

HENRY MEWES, OF BINGHAMTON, NEW YORK, ASSIGNOR TO JOHN W. CUTLER, OF SAME PLACE.

Letters Patent No. 105,111, dated July 5, 1870.

IMPROVEMENT IN CUTTING APPARATUS FOR HARVESTERS.

The Schedule referred to in these Letters Patent and making part of the same.

*To all whom it may concern:*

Be it known that I, HENRY MEWES, of Binghamton, in the county of Broome and in the State of New York, have invented certain new and useful Improvements in Harvesters; and do hereby declare that the following is a full, clear, and exact description thereof, reference being had to the accompanying drawing making a part of this specification, in which—

Figure 1 is a plan view of my improved device; and

Figure 2 is a vertical longitudinal section of the same, on the line x x of fig. 1.

Letters of like name and kind refer to like parts in each of the figures.

My invention is an improvement in harvesters; and

It consists in the employment of a divided cutter-bar, the sections of which are caused to move simultaneously in opposite directions, as is hereinafter set forth.

In harvesters, as ordinarily constructed, the cutter-bar, pitman, and crank move simultaneously in the same direction, and, not being counterbalanced, their weight causes a considerable shock and strain each time that their direction is changed, whereby the durability of the parts immediately connected therewith is largely decreased.

To obviate these objections, I divide the cutter-bar transversely into two sections, A and B, which sections work upon the same finger-bar, and are connected by means of pitmen C and D, with suitable cranks, E and F, attached to and forming a part of a shaft, G, which cranks are placed directly opposite to each other, so as to cause said pitmen and sections to move simultaneously in opposite directions.

The result of such construction and arrangement of the cutter-bar and its operating devices is to entirely prevent the customary shock and noise from their operation, to enable the machine to run steadily and with little noise, and to largely increase its durability.

Having thus fully set forth the nature and merits of my invention,

What I claim as new, and desire to secure by Letters Patent, is—

A transversely-divided cutter-bar, arranged and operated as described, so that the sections thereof shall move simultaneously in opposite directions.

In testimony that I claim the foregoing, I have hereunto set my hand this 28th day of December, 1869.

HENRY MEWES.

Witnesses:
E. W. BRIGHAM,
G. W. PENRIE.